Nov. 29, 1949            S. WALD            2,489,689
SERVO SYSTEM WITH EDDY CURRENT BRAKE
CONTROLLED BY ERROR VOLTAGE
Filed Dec. 14, 1946
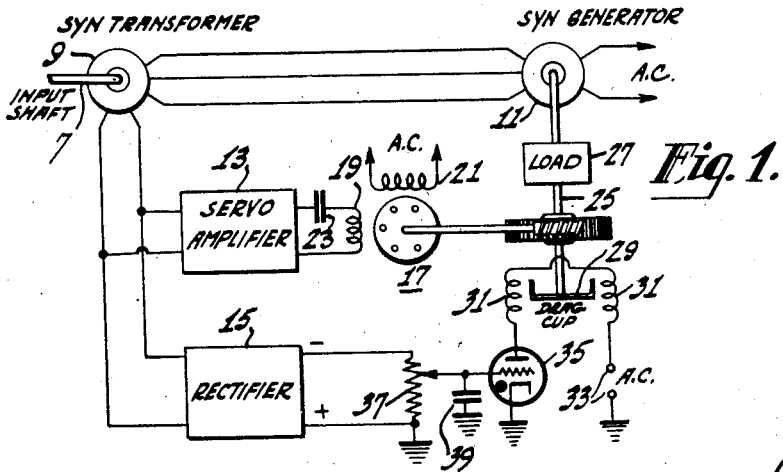
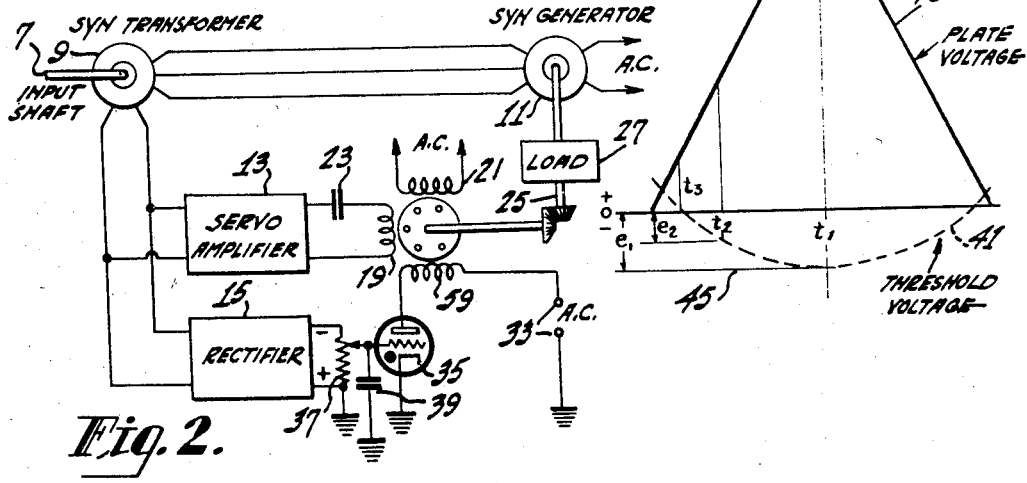
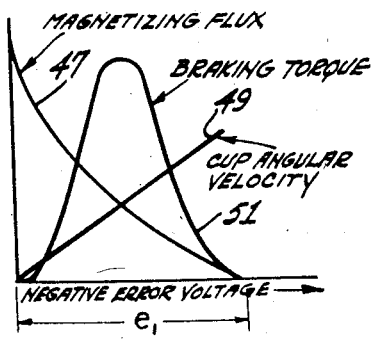
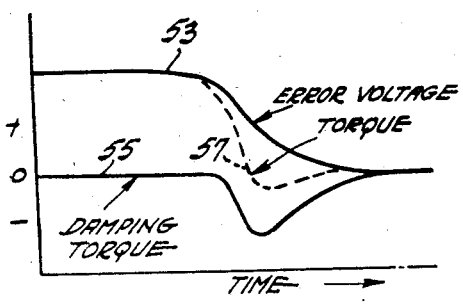
INVENTOR
Sidney Wald
BY
ATTORNEY Patented Nov. 29, 1949

2,489,689

UNITED STATES PATENT OFFICE 2,489,689

SERVO SYSTEM WITH EDDY CURRENT BRAKE CONTROLLED BY ERROR VOLTAGE

Sidney Wald, Philadelphia, Pa., assignor to Radio Corporation of America, a corporation of Delaware Application December 14, 1946, Serial No. 716,296

2 Claims. (Cl. 318—30)

This invention relates to electrical servo systems and in particular to a stabilized servo system employing error rate damping which is obtained in a novel manner.

As is well known, the purpose of a servo system is to cause an output load, which may be remotely located, to follow accurately the position of a rotatably controlled input shaft. In general, such a servo system comprises an input shaft which may be rotated by hand or driven to a predetermined position by other apparatus, this shaft constituting a standard to which the angular position of the output shaft or load is compared. The output load is driven by the system into positional correspondence with the input shaft and a differential or error detecting device is employed to compare the instantaneous positions of the two shafts and to produce an indication or error signal proportional to the instantaneous departure from the desired condition of positional agreement. The system also embodies a controller whose function is to convert the error voltage into a source of power which is utilized to drive the output shaft in such a direction as to minimize the error voltage. Finally the system may include damping devices to reduce the tendency of the system to hunt or oscillate and to reduce transient or steady state errors thereby increasing the speed or accuracy of the system.

Oscillation or hunting is caused by the fact that a servo system is inherently endowed with inertia and as the moving parts are brought toward the desired position under the control of the error voltage, the inertia tends to carry the system beyond the point of balance, thus throwing it into reverse. If the system is sufficiently unstable it will again overshoot the balance position and the device will then hunt back and forth over the desired null for a greater or less length of time. Various methods of overcoming the disadvantages of such oscillation, and to improve the instantaneous positional agreement of the system have been suggested. In general these may be classed either as viscous damping systems or error rate damping systems. In the former system a retarding force is applied to the output member which is proportional to its speed of motion or rotation so as to reduce the amplitude and duration of the transient oscillation. Such damping can be obtained by conventional methods through mechanical friction devices such as dashpots, friction discs and the like, or by means of electromagnetic friction devices such as eddy-current dampers in which the damping is a function of the speed of the output member. Conventional error rate damping systems operate under the control of a voltage which is proportional to the rate of change of the error voltage, and usually employ a differentiating circuit including electrical reactance elements.

The principal disadvantage of purely viscous damping systems is that a constant error is introduced in the steady state condition. That is, the output device, due to the frictional load, tends to lag the input device by a fixed amount. The principal disadvantage of error rate systems, which it is the primary object of this invention to overcome, arises from the fact that such systems are usually sensitive to changes in the frequency of the controlling current. While this disadvantage may not always be serious, as where the operating current is derived from commercial 60 cycle power lines and remains reasonably constant, it has been found that the actual frequency of power systems provided in aircraft may vary between 200 and 800 cycles. Differentiating circuits which are designed to produce a given error rate voltage based on the nominal frequency of 400 cycles will be considerably affected by changes in the frequency of the error voltage to this extent. It is therefore impractical to use the conventional "notch" filter or other reactive differentiating circuits in aircraft. It is therefore a further object of this invention to provide an improved servo system.

A still further object of this invention is to provide effective error rate stabilization in an A. C. operated servo system which is independent of the frequency of the controlling voltage.

A still further object of this invention is to provide, in an A. C. operated servo system a damping arrangement which is equivalent to conventional error rate damping but which is not subject to the disadvantages of the prior art.

It is a still further object of this invention to provide an improved means for applying a braking torque to a servo system.

A still further object of this invention is to provide a servo system in which the braking torque applied to the output shaft is a function of the velocity of the output shaft and the magnitude of the displacement error and hence the error voltage.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Fig. 1 is a circuit diagram of a preferred embodiment of this invention;

Fig. 2 is a circuit diagram of an alternative embodiment of this invention; and

Figs. 3 to 5 inclusive are curves which are useful in understanding the operation of the devices illustrated in Figs. 1 and 2.

Referring to Fig. 1, an input shaft 7 is connected to the rotor of a conventional synchro transformer 9. The stator is connected by three leads to the remotely located synchro-generator 11. Electrical connections from the rotor of synchro transformer 9 are made to the input of a servo amplifier 13 and also to a full wave rectifier 15. The servo amplifier 13 is a conventional amplifier of the type employed to convert the error voltage which is applied to its input terminals into an alternating current of reversing phase and having sufficient intensity to drive an induction motor 17. The output of the amplifier is applied to one winding 19 of the induction motor. A second winding 21 is connected to the available source of A. C. power, which, in the present case, is assumed to be the 400 cycle source available in an aircraft. In order to provide rotation of the motor in either one of two directions, a quadrature phasal relationship between the current flowing in the two motor windings 19 and 21 is established by conventional means such as a series capacitor 23. The rotor of induction motor 17 is connected to the output shaft 25 of the device, either by means of a suitable gear mechanism, or by a direct coupling. The output shaft 25 is connected to the load device indicated by block 27 and to the rotor of synchro-generator 11.

A metallic disc conventionally known as a "drag cup" 29 is also coupled to the output shaft 25 and is rotatable therewith. Direct coupling may be employed by mounting the drag cup directly on the output shaft, if its speed is sufficiently high, or it may be coupled through a step-up gear. The drag cup is located adjacent one or more inductor coils 31 so as to be affected by the magnetic field established by the coils. The coils are serially connected between a suitable source of A. C. potential at terminals 33 and the plate circuit of a grid controlled discharge device 35 which may be a conventional gas discharge Thyratron tube. The grid electrode of the Thyratron 35 is connected to the movable contact arm of a potentiometer 37 which is connected across the output of rectifier 15. A filter capacitor 39 may be connected between grid and ground. The polarity of connections within the rectifier is such that a negative unipotential voltage is applied to the grid of the Thyratron which is, due to the action of the rectifier, proportional to the average amplitude of the error voltage.

The operation of the servo system itself is conventional. The synchro transformer produces an A. C. error voltage the amplitude of which is proportional to the angular displacement between the input and the output shafts. This error voltage is applied to the motor 17 so as to cause it to rotate in such a direction as to minimize the error.

At the same time, the error voltage is rectified and the negative unipotential bias is applied to the grid of Thyratron 35. The operation of this tube is best understood by reference to Fig. 3, which illustrates the positive half cycle of the applied alternating plate voltage. Since the tube is non-conductive during the negative half cycle this period need not be considered. The dotted line 41 represents the threshold control grid voltage in somewhat exaggerated proportions for the purpose of illustration. The threshold voltage curve gives, for the tube in question, the amplitude and polarity of the grid voltage which is required to cause the tube to become conductive for the indicated value of the plate voltage as determined by curve 43.

It will be observed that when the plate voltage is very small, the tube will become conductive only when the grid voltage is slightly positive, and as the plate voltage becomes more positive the tube will become conductive first with a zero grid bias and then with a somewhat negative grid bias. The horizontal line 45 represents the minimum negative grid bias $e_1$ which is required to cause the tube to become conductive. If the negative grid bias exceeds this value the tube will remain cut off. It will also be noted that when the grid bias has this value $e_1$, the tube will begin to conduct at time $t_1$, which is 90° after the beginning of the cycle. The average current will therefore be relatively low. As the amplitude of the negative grid bias is decreased to a value $e_2$, for example, it will be observed that the grid bias line intersects the threshold voltage curve at time $t_2$ which is considerably earlier with respect to the time cycle than is time $t_1$. The average current will therefore be considerably greater. With zero grid bias the tube will begin to conduct at time $t_3$ which causes current to pass through substantially the entire positive half cycle of the applied plate voltage.

It is thus apparent that when the error voltage is large, the rectified error voltage applied to the tube will exceed the critical value $e_1$ and the tube will remain non-conductive. Under this condition no current flows through inductors 31 and there is no braking action produced by the drag cup. This is a desired condition, since the absence of a damping load when the error voltage is large permits maximum speed of rotation in the output shaft and permits the device to follow most readily the movement of the input shaft. However, as the displacement error is reduced and the error voltage decreases in amplitude, it is then desirable to provide a braking action for the purpose of preventing hunting. At a point which is determined by the adjustment of potentiometer 37, the negative grid bias of the Thyratron reaches the critical value and a unidirectional current flows through inductors 31, causing the drag cup to produce a braking action on the output shaft, the direction of which is such as to oppose the existing direction of rotation. The braking current then increases substantially linearly as the error voltage approaches zero.

The resultant braking action can best be illustrated by reference to Fig. 4. It is well known that the braking action of a drag cup is approximately directly proportional to the magnetizing flux of the field in which it is rotating. Since within the limits from zero to the value $-e_1$ the energizing current and hence the magnetizing flux is inversely proportional to the amplitude of the negative error voltage, curve 47 may be said to represent the magnetizing flux intensity as a function of a negative error voltage. When the error voltage is zero the magnetizing flux has reached a fixed predetermined maximum value, and when the negative error voltage reaches the predetermined amplitude $e_1$ the Thyratron remains cut off and the magnetizing flux is zero. At the same time, when the error voltage is zero the system is in balance and the angular velocity of the output shaft, and hence of the drag cup, is also zero. However, when the error voltage increases the angular velocity of the drag cup increases substantially linearly as shown by curve 49.

It is also known that the braking torque produced by a drag cup subject to a magnetic field is a function of the product of its velocity and the intensity of the magnetizing flux. Curve 51 is derived by obtaining the product of the magnetizing flux and velocity curves and therefore represents the braking torque. It will be seen that the braking torque is zero when the error voltage reaches the value $e_1$.

As stated above, error rate damping applies to the output system a damping or restraining torque which is proportional to the rate of change of error voltage. Consequently, if the present system is to produce results comparable with conventional error rate systems it must be shown that the braking torque is zero in the steady state condition and a maximum when the rate of change of error voltage is a maximum. This similarity may best be illustrated by reference to Fig. 5 in which curve 53 represents the variation in time of the error voltage, it being assumed that steady state error exists and that as the servo system operates to correct the error the error voltage is then reduced to zero. Transferring the braking torque curve from Fig. 4 and inverting it, since its torque opposes the torque of the followup system, it will be seen that curve 55 represents the braking torque of the present system. So long as the error voltage exceeds a predetermined value and the unipotential voltage applied to the Thyratron exceeds the value $e_1$, the braking or damping torque is zero.

Since the actual velocity of the output shaft is determined by the difference between the driving torque produced by the followup system (or the inertia of the system) and the braking torque produced by the drag cup, the resultant or effective torque is represented by the difference between curves 53 and 55 shown as curve 57. It will be seen that the braking torque is a maximum at a time which corresponds to the maximum rate of change of error voltage, as is the case in an error rate system.

An alternative arrangement is shown in Fig. 2, in which the rotor of induction motor 17 is itself used to perform the functions of a drag cup. The synchro-transformer 9 and synchro-generator 11 are connected to the servo amplifier 13, rectifier 15 and the output shaft 25, respectively, as in the preceding case. The drag cup 29 is not required in the present embodiment, however. Instead, the unidirectional current from Thyratron 35 is caused to flow through an inductor 59 which is suitably mounted in induction motor 17 so as to be in inductive relationship with its rotor. As a result the rotor moves in the magnetic field and functions in identically the same manner as did the drag cup in the description above.

It will be observed from the above description that a system has been produced which essentially duplicates the damping action of an error rate system, but no circuits have been employed which have a critical frequency characteristic. Thus an effective damping action has been achieved which is free from any deleterious effects due to changes in the frequency of the applied alternating voltage. The position of the braking torque curve with respect to the amplitude of the error voltage can readily be adjusted by means of potentiometer 37 so as to produce the desired braking torque to provide critical damping.

As a practical matter it has been found that the inherent capacity between the grid electrode of the electron tube 35 and ground is usually sufficient to provide the necessary filtering action for the rectified error voltage. However, if in a given installation this is not the fact, capacitor 39 may be employed. It is not necessary to provide a perfectly filtered grid bias voltage since the operation of the device will be essentially as described above even though the rectified error voltage available across potentiometer 35 varies considerably in amplitude. The full wave rectifier 15 may be a thermionic discharge device or a small crystal rectifier of any of the well known varieties. In servo systems of the type which produces a D. C. error voltage it will not be necessary to utilize rectifier 15, since the D. C. error voltage may be applied directly to potentiometer 37.

I have thus described a servo system which is highly efficient in operation, economical in parts, unaffected by variation in the frequency of line voltage and which provides effective error rate damping.

What I claim is:

1. In a servo system including an input shaft, an output shaft, means responsive to difference in the angular positions of said shafts to provide an error voltage, a motor coupled to said output shaft, and means responsive to said error voltage to energize said motor for rotating said output shaft toward positional agreement with said input shaft, anti-hunt means including braking means for said motor, said brake including a magnet winding, an alternating current source of supply for said winding, a grid controlled gas-filled rectifier tube connected between said source and said winding, and means responsive to said error voltage to bias said rectifier against conduction to an extent substantially proportional to the magnitude of said error voltage.

2. In a servo system including an input shaft, an output shaft, means responsive to difference in the angular positions of said shafts to provide an error voltage, a motor coupled to said output shaft, and means responsive to said error voltage to energize said motor for rotating said output shaft toward positional agreement with said input shaft, anti-hunt means including an eddy current brake coupled to said motor, said brake including a field winding, an alternating current source of supply for said field winding, a grid controlled rectifier of the gas filled type connected between said source and said winding, and means responsive to said error voltage to bias said rectifier against conduction to an extent substantially proportional to the magnitude of said error voltage, whereby said brake winding is fully de-energized during at least a portion of each cycle of said alternating current supply.

SIDNEY WALD.

REFERENCES CITED

The following references are of record in the file of this patent:

UNITED STATES PATENTS

| Number | Name | Date |
|---|---|---|
| 2,184,576 | Beyerle | Dec. 26, 1939 |
| 2,196,402 | Snyder | Apr. 9, 1940 |